3,137,126
METHOD AND MEANS FOR FORMING A
GASEOUS PASSAGE
Ira B. Madison, Pacoima, Calif., assignor to
North American Aviation, Inc.
Filed Jan. 11, 1961, Ser. No. 81,998
10 Claims. (Cl. 60—35.3)

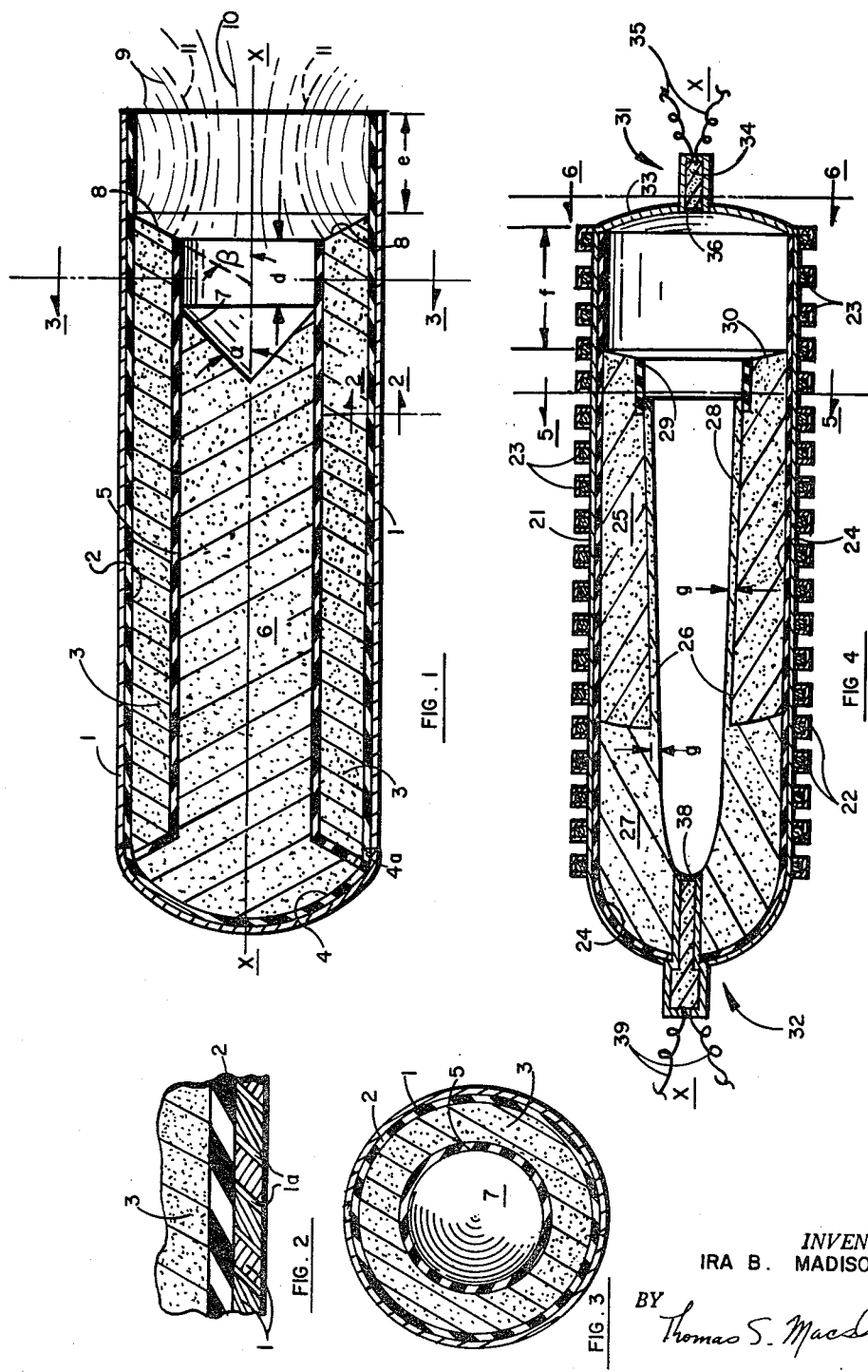

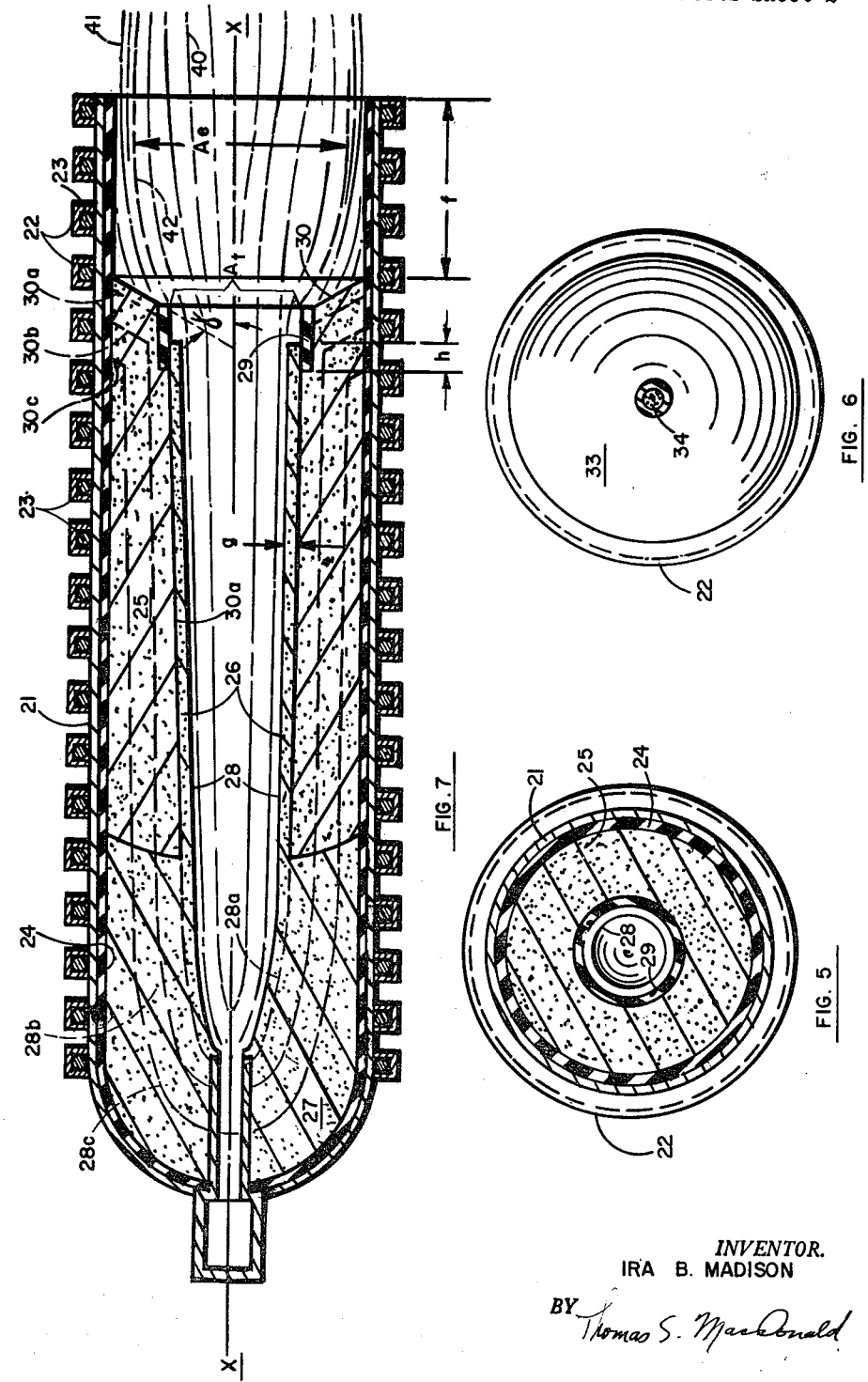

This invention relates to a method and means for forming a gaseous passage and more particularly relates to a method and means whereby the expansion of a main gaseous stream generated by a main burning constituent is continuously and accurately controlled by means of a secondary gaseous stream continuously and progressively generated therearound. The novel concepts of this invention finds particular utility in modern day solid propellant applications.

In modern day rocket motor applications utilizing solid propellants, it is desirable to provide a device which is light in weight and yet satisfies rugged performance requirements. The reduction of rocket case weight provides for the capability of greater payloads and/or rockets adapted for longer flight durations. Such desired functions may be readily achieved for any particular rocket having a given gross weight, by effecting a greater mass ratio. Mass ratio is a state of the art terminology which may be expressed by the following formula:

$$\text{Mass Ratio} = \frac{Wpay + Ws + Wpl}{Wpay + Ws}$$

wherein $Wpay$=The total payload weight (lbs.)
$Ws$=The total structural component weight (lbs.)
$Wpl$=The total propellant weight (lbs.)

The present-day solid propellant rocket motor art provides many devices wherein the general complexity and increased weight thereof function to severely curtail the operational efficiencies of such rockets and in particular, the Mass Ratio thereof. Furthermore, the desirability for close control of system performance has provided another problem area which has not been adequately solved by present-day rockets. Also, such present-day rocket motors generally require a conventional bell shaped type rocket nozzle, for example, which requirement incurs an additional weight penalty.

The present invention has overcome the inadequacies of the prior art by providing a device for progressively forming a gaseous passage comprising: a main burning means for continuously and progressively discharging a first gas when burned, and secondary burning means constructed and arranged around said main burning means for burning and continuously and progressively discharging a second gas which forms a gaseous passage for controlling the expansion of said first gas during all phases of burning.

An object of this invention is to provide an economical solid propellant rocket having high performance capabilities.

Another object of this invention is to provide a light weight solid propellant rocket which is simple in construction but yet meets rugged and high performance requirements.

Still another object of this invention is to provide a rocket of the solid propellant type wherein a thrust-time program can be accurately controlled during all phases of flight duration.

Still another object of this invention is to provide a solid propellant type rocket capable of using solid propellant constituents which generate extremely high temperatures during burning.

Still another object of this invention is to provide a method whereby a continuous gaseous passage is progressively formed to continuously provide for accurate thrust control.

These and other objects of this invention will become apparent from the following description taken in connection with the accompanying drawings, in which:

FIG. 1 is a longitudinal cross-sectional view disclosing a first preferred rocket embodiment employing the novel concepts of this invention.

FIG. 2 is a partial cross-sectional view taken on lines 2—2 in FIG. 1.

FIG. 3 is a cross-sectional view taken on lines 3—3 in FIG. 1.

FIG. 4 is a longitudinal cross-sectional view disclosing a second preferred rocket embodiment employing the novel concepts of this invention.

FIG. 5 is a cross-sectional view taken on lines 5—5 in FIG. 4.

FIG. 6 is an end view taken on lines 6—6 of FIG. 5.

FIG. 7 is a view disclosing the rocket of FIG. 3 as it would appear in flight.

The purpose of this invention is to provide for the progressive formation of a gaseous passage wherein a main burning means is provided for progressively burning at a predetermined rate from a first end to a second end thereof so as to continuously generate a main actuating exhaust stream. A secondary burning means surrounds said main burning means and is also adapted to progressively burn at a predetermined rate relative to the burning rate of said main burning means. The secondary burning means is constructed and arranged relative to said main burning means for continuously generating a secondary exhaust stream operative to form a continuous gaseous passage of predetermined configuration for guiding said main exhaust stream to thereby precisely control the expansion thereof. A casing means surrounds said secondary burning means and is adapted to progressively erode relative to said secondary burning means to thereby aid in the controlled guidance of said main exhaust stream.

FIG. 1 is a longitudinal cross-sectional view disclosing a first preferred rocket embodiment of the solid propellant type employing the novel concepts of this invention. Although a rocket application has been set forth for illustration purposes, it is to be understood that the spirit of this invention is not limited thereto, as will be hereinafter more fully explained. The solid propellant rocket disclosed therein is shown as it would appear subsequent to the actuation thereof.

An outer casing 1, preferably primarily constructed and arranged to progressively erode, functions to protect and radially support the inner rocket structure and further functions to contain the extreme pressures generated within the rocket. As will be hereinafter more fully explained, it is desirable to permit the progressive incremental linear (toward the fore end of the rocket) erosion of the outer casing during a particular preconceived flight duration. To fulfill such desiderata, the outer casing 1 may conveniently comprise a plurality of chamfered hoop shaped members which are welded tgether at 1a as shown more clearly in FIG. 2. The material utilized therefor may comprise an aluminum, steel, titanium or fiber glass constituent or any other constituent which maintains the desired hoop strength characteristics at extreme temperatures and pressures. The selected number thereof is a matter of choice depending on the particular work application. Furthermore, it is to be understood that the segments 1 may comprise varied linear lengths, if so desired.

The welds 1a may comprise a conventional welding constituent suitable for use with the selected hoop member material. The selected welding constituent should be such that a melting thereof occurs at a predetermined temperature for purposes hereinafter explained. Also, to aid in the controlled progressive linear shortening of the casing 1, a relatively thin coating 2 comprising a conventional type rubber or plastic based inhibitor (insulator) may be utilized as will be hereinafter more fully explained.

Although the hereinafter described illustrated embodiments are discussed in terms of propellant or grain actuating means, it is well within the scope of this invention to substitute the term "burning means" therefor. Such a determination is readily ascertained since, as will be hereinafter noted, the novel concepts of this invention may be utilized in other applications outside of the rocket field.

A secondary propellant means or grain 3, preferably of the solid type, is cast into the desired illustrated tubular form by means of conventional casting techniques. For illustration purposes, the secondary propellant grain 3 is shaped in the form of a sleeve as shown and may comprise any conventional composite or double based type solid propellant constituent. For example, the secondary grain may comprise an ammonium perchlorate oxidizer and polyurethane fuel binder of the composite type. Other examples of solid propellant constituents which may be utilized in lieu thereof comprise an ammonium nitrate-"Philprene VP-15" combination, also of the composite type, or a double based propellant constituent comprising a nitroglycerin-nitrocellulose combination. The specific propellant means utilized herein do not comprise a novel aspect of this invention.

A dish shaped shield member 4 may be utilized, if so desired, to protect the fore end of the rocket device from extreme buffeting environments encountered during high speed operation. The inhibitive shield 4 may comprise, for example, any conventional rubber or plastic based material which maintains the desired strength and insulative characteristics at extremely high temperatures and pressures. As shown at 4a, the aft edge of the shield 4 envelopes the fore end of the secondary propellant grain 3.

A standard inhibitor 5 in liner form is preferably thinly coated on the interior wall portions of the secondary propellant means 3 in a conventional manner such as by spraying or painting so as to form a physical heat barrier thereat. It should be noted that the inhibitive means 5 is constructed and arranged to cover the entire inwardly facing wall of the secondary propellant and the outwardly facing wall of a primary propellant means or grain 6 so that only "end burning" occurs therein, i.e., the respective propellant means only burn at their aft most ends. The inhibitor 5 may comprise any state of the art material which will readily function to insulate the inwardly facing surface of the secondary propellant means 3 from the primary propellant means 6 which is positioned interiorly thereof. Such an inhibitor means 5 may comprise any desired conventional type rubber or plastic based constituent such as insulator which will readily decompose along its linear axis at a predetermined temperature level for purposes hereinafter set forth.

For illustration purposes, the main or primary propellant means 6 is shown as cast into a mushroom shape. The primary propellant means 6, like the secondary propellant means 3, may comprise any desired conventional type solid propellant constituent. Although it is desirable to utilize the same constituent for the primary and secondary propellant means in many applications, it is well within the scope of this invention to utilize propellant constituents therefor which have relatively different linear burning rates. In such applications the utilization of different propellant constituents, having different relative linear burning rates, provides for a control factor whereby the relative burning therebetween may be selectively varied to assure the desired precalculated thrust-time program requirements.

A conically shaped cutout portion functions to form a burning surface portion 7 (FIGS. 1 and 3) in the primary propellant means 6 so as to provide a greater burning surface area thereat. As shown, the surface portions 7 are constructed and arranged at an angle $\alpha$ with respect to the longitudinal axis X—X. Burning surface portion 8 of the secondary grain 3 is constructed and arranged to form an angle $\beta$ relative to said longitudinal axis X—X. Both of the angles $\alpha$ and $\beta$ preferably comprise an angle selected from the range of 30°–60° for most design applications, although such selected angles should not be understood to be critical. For example, the angles $\alpha$ and $\beta$ could be constructed and arranged at an angle of 90°. However, the employment of an angle ($\alpha$ and/or $\beta$) selected from the range of 30–60° functions to aid in the formation of the gaseous throat, as will be hereinafter more fully explained.

The aft most end portions of the primary and secondary grains are axially staggered at a distance "$d$" as shown. Since the continuous burning of the primary and secondary propellant means occurs substantially normal to the respective burning surfaces 7 and 8 thereof, it is well within the scope of this invention to construct and arrange the burning surfaces in such a manner so as to maintain a predetermined distance therebetween during all operational phases or to progressively increase or decrease the relative linear distance "$d$" therebetween at a predetermined rate. Although a specific configuration has been shown to illustrate both the primary propellant means it is to be understood that any desired shape may be employed therefor, depending on the specific performance requirements.

The preselected rate of linear burning between the primary and secondary propellant means is primarily determined by the pressures and temperatures encountered at the respective burning surfaces 7 and 8 and may be primarily effectively controlled by: (1) selectively utilizing the same or different types of respective propellant constituents, (2) selectively varying the "grain size" of such constituents, (3) selectively varying the geometry of such constituents (for example, the diameters of the effective burning areas 7 and 8), and (4) determining what the ambient conditions will be during rocket travel and compute the effect thereof on the secondary propellant means burning surface 8 (ambient conditions will have little or no effect on the rate of primary propellant burning). The above noted parameters also determine, to a large measure, the chamber pressures, thrust level and duration. It thus becomes obvious that a wide range of thrust-time programs may be readily achieved.

*Method of Operation*

The rocket of FIG. 1 is actuated by conventional ignition means (not shown) to thereby simultaneously initiate burning on the surfaces of the respective primary and secondary propellant grains which are exposed to the ignition gases. Such conventional ignition means will be more fully explained in conjunction with the hereinafter illustrated FIG. 4 embodiment.

Assuming the utilization of primary and secondary grains having substantially equal linear burning rate characteristics, upon the simultaneous burning thereof a local pressure disturbance is occasioned thereat primarily due to the mass addition and a velocity differential of predetermined magnitude afforded by a secondary combustion gas stream 9 which is selectively generated in surrounding relationship with respect to a main combustion gas stream 10. It may be generally stated that since the main gas stream 10 has a relatively higher linear velocity and consequently a lower static pressure than that of the secondary gas stream 9, that the secondary gas stream will function to literally squeeze the main gas stream to thus form a throat portion 11.

As hereinbefore stated, the preselected type of propellant constituents utilized and the particular configurations thereof are the basic parameters which may be selectively varied to provide for the controlled formation of the gaseous throat 11. It is apparent that such a formed gaseous throat is operative to continuously form a passage for controlling the expansion of said main gas stream 10 during all phases of main propellant burning. For example, the inwardly and forwardly constructed burning surface 8 aids in the directing of the secondary gas stream 9 into the relative axial flow axis X—X of the primary gas stream 10 at an angle which is complementary to the disclosed angle β. As also hereinbefore stated, the angle β is preferably formed between 30° and 60° for the majority of design applications. However, should the angle β comprise 90°, for example, primarily due to the relative pressure differential of the respective gas streams the throat or passage 11 would still be formed.

The nozzling process which is thus provided by such a structural arrangement is accordingly understood to be continuous primarily due to the equal or otherwise controlled burning rates of both the primary and secondary grains. Thus, primarily due to the fact that the progressive burning of the respective aft end burning portions of the propellant grains occur substantially normal thereto, the propellants will retain their particular respective angles α and β during all phases of rocket actuation.

During the progressive linear burning (toward the fore end of the rocket) of the primary and secondary propellant constitutents, it is desirable in the majority of applications to permit the controlled linear decomposition of the outer casing 1. Such a function is generally desirable so as to maintain a predetermined linear distance "e" between the aft most end portion of the secondary burning surface 8 and the aft edge of the outer casing 1 so as to provide a baffle means thereat to aid in the formation of the gaseous throat 11. In accordance therewith, the structural and compositional make-up of the outer casing 1 is such so as to assure the accurate incremental erosion thereof in a forward linear direction. Such an incremental erosion of the outer casing 1 may be readily achieved primarily due to the fact that one particular incremental cross-section of said casing will be subjected to a greater amount of heat generated by the primary and secondary gas streams than will the incremental section forward thereof. Due to this relatively varying rate of heat exposure, at the progressively melted weld joints 1a, an accurate predetermination of the rate at which the outer casing will be progressively shortened by the incremental release of the longitudinally abutting hoop members may be readily computed. Also, as above stated, the linear dimensions of the segments 1 may comprise varying predetermined lengths to thereby vary the length "e" in a predetermined manner.

As hereinbefore stated, a coating 2 comprising an inhibitive type means of the conventional type may be sprayed or bonded onto the inwardly facing wall of the outer casing 1. Such a coating may be conveniently utilized to aid in the protection of the outer casing 1 from the heat of combustion contained therein to thereby raise the temperature level at which the weld joints 1a are caused to melt. The inhibitive means may be readily constructed and arranged of such a material and thickness to incrementally decompose in a linear direction when a predetermined amount of heat is absorbed thereby. The decomposition of such an inhibitor would then function to expose and permit the progressive melting of the weld joints 1a which joints function to structurally join the hoop members comprising the outer casing 1.

It should be again noted that the staggered burning of the secondary propellant means 3 relative to the burning of the primary propellant means 6 functions to aid in the gaseous constriction of the main exhaust jet 10 primarily due to the fact that a static pressure differential is created adjacent to the burning surface 8 of the secondary grain. Although it is desired in most applications to utilize the above described progressively eroded outer casing 1 in combination therewith, it should be noted that the outer casing may be dispensed with, thus providing a sub-combination type embodiment employing only the primary and secondary burning means for the formation of the progressively provided gaseous nozzle means. However, it should be noted that the progressively shortened outer casing aids in the accurate formation of the desired gaseous nozzle.

FIGS. 4–7 inclusive, disclose a second embodiment employing the novel concepts of this invention. An outer casing 21 functions to contain and protect the inner workings of the disclosed rocket device. The outer casing 21 may comprise a thin walled tubular structure constructed of a conventional type material having the desired hoop strength characteristics at relatively high temperatures and pressures. For example, aluminum, steel, titanium and the like, may be conveniently used therefor. A plurality of circumferentially extending channel members 22 are radially secured to the outer casing 21 by conventional welding methods. The preselected number, size and relative positioning thereof comprises a matter of choice on the part of the manufacturer. The channel members may be conveniently constructed of the same material utilized to form the outer casing and function to lend further radial stability thereto. In this connection note FIG. 5.

A plurality of hoop shaped pyrotechnic members 23 are contained within the channel members, as shown, and function to explode to cause a shearing and progressive erosion of the outer casing portion radially adjacent thereto when said members are subjected to a predetermined amount of heat. Such a precalculated erosion of the outer casing provides for the accurate maintenance of the desired linear distance "f," as shown. For example, such hoop shaped members may comprise a conventional pliable type "Primacord" material manufactured by E. I. du Pont de Nemours & Company. Such a standard cordlike material may be readily obtained in roll form and is readily adaptable to be formed into the desired hoop shaped configurations. A typical applicable burning rate of such a "Primacord" material approximates 20,000 f.p.s.

If desired, an inhibitive type coating 24, similar in construction to the coating 2 of the FIG. 1 embodiment, may be readily employed to controllably raise the temperature level at which the members 23 are caused to explode.

It should be understood that the above disclosed FIG. 4 erodable type outer casing construction may be readily substituted in lieu of the one disclosed in FIG. 1, and vice versa.

A secondary propellant means 25 is preferably cast into a cylindrical form, as shown, and is constructed and arranged to surround a tapered cylindrical portion 26 of a primary propellant means 27. The portion 26 preferably comprises a uniform thickness "g" for purposes hereinafter set forth. The inwardly facing wall of both the secondary and primary grains are slightly tapered in the conventional manner, relative to the longitudinal axis X—X as shown. A relatively large hollow portion is thus formed in the primary propellant means 27 and functions to provide a relatively large burning surface 28 for purposes also hereinafter set forth.

An inhibitor 29, similar in compositional make-up to the inhibitor 5 of the FIG. 1 embodiment, is utilized to separate the primary and secondary propellant means thereat over a linear dimension "h" which preferably substantially comprises the same dimension as thickness "g" of the cylindrical portion 26. The secondary propellant means terminates at an aft end surface portion 30. Similar to the surface 8 disclosed in the first preferred embodiment, the surface 30 of FIG. 4 may be constructed and arranged to form an angle γ which is preferably 30°–60° relative to the longitudinal axis X—X.

The above explained second preferred rocket embodiment of FIG. 4, may be readily actuated by means of a conventional pyrotechnic type actuating cartridge 31 or 32 which specific type cartridge constructions do not comprise any of the novel aspects of this invention. For example, an ignition device of the type disclosed in U.S. Patent No. 2,934,897, may be conveniently employed therefor. The prime requirement which must be afforded by such an employed actuating device is one of assuring the generation of an ignition gas which provides a sufficiently high temperature and pressure to assure simultaneous burning of all of the propellant surface portions which are exposed thereto.

One type of constructed and arranged ignition device which may be conveniently used for such a function is generally shown at 31. This device comprises an end plate 33 which is secured to the aft end portion of the casing 21 in a conventional press-fit or weld type manner (FIG. 6) so as to accurately position the cartridge member and at the same time positively contain the internally injected ignition gases thereat. An explosive charge 34 of the conventional type is contained within the cartridge and is adapted to be ignited when a current of sufficient magnitude is permitted to flow through the wire leads 35 which are in turn operatively connected to a conventional power source. A burst diaphragm 36 functions to contain the explosive charge and is constructed and arranged in the conventional manner to burst when a sufficient pressure is generated by the exploded charge 34.

The ignition device, generally noted at 32, may be readily used in lieu of the above described ignition device 31 for many rocket applications. The operation thereof is substantially the same, that is, a highly explosive type charge 37 is contained in the cartridge by means of the burst diaphragm 38 and is adapted to generate a high temperatured, highly pressurized ignition gas by means of electrical connections 39.

The above described conventional type ignition devices may also be conveniently constructed and arranged to actuate the rocket device of FIG. 1.

*Method of Operation*

As more clearly shown in FIG. 7, upon the simultaneous burning of the primary and secondary propellants by means of the ignition means 31 (FIG. 4), for example, a main exhaust jet stream 40 and a secondary exhaust jet stream 41 operatively function to form a bell shaped passage portion 42. Unlike the first embodiment of FIG. 1, wherein a restricted gaseous throat portion 11 was effectively provided, the FIG. 7 embodiment is so constructed and arranged to continuously and progressively provide that a gaseous expansion type bell shaped portion 42 and a restricted throat adjacent the aft or burning end 30 of the secondary propellant means 25. In the herein described method of operation it is assumed that the primary and secondary propellant means comprise identical constituents, providing for the same relative burning rates.

In this particular application, the inhibitive means 29 is only constructed and arranged to separate the respective propellant means along an axial length "$h$" since it is desired to permit the simultaneous radial burning of an inwardly facing wall portion 30a of the secondary propellant means when the burning surface 28 of the primary propellant means has receded to the position noted by dotted line 28a. It is further apparent that due to the axial burning of the secondary propellant means 25, the burning end portion thereof also progresses an axial distance, to the dotted line position 30a. Upon further relative constant burning of the respective propellant grains, the planes formed by the burning surfaces of the primary and secondary propellant means will remain substantially flush relative to each other as shown by the dotted line positions 28b and 28c, for example. The dotted line position 30a, progressively assumed by the aft burning surface 30, will progressively assume the respective dotted line positions 30b and 30c.

By utilizing such a structural arrangement, a very precisely precalculated thrust-time program may be readily achieved. During the initial actuation stages of the rocket (prior to the radial burning of the secondary grain 25) primarily due to the predetermined constant expansion area ratio ($\epsilon$) a relatively constant initial thrust level may be readily maintained. The expansion area ratio is defined as follows:

$$\epsilon = \frac{A e}{A_t}$$

wherein:

$Ae$ = The nozzle exit area (in.$^2$)
$A_t$ = The restricted nozzle throat area (in.$^2$)

The exposed burning area 30 of the secondary grain 27 is thus maintained in a neutral condition, i.e., the exposed area remains substantially constant (there is a slight increase thereof due to slight taper afforded the secondary grain 25). During this time period the burning surface 28 of the primary grain assumes a progressive state, i.e., the exposed area thereof increases and therefore the chamber pressure therein increases.

When the radial burning of the secondary grain commences, it is apparent that the throat area ($A_t$) will become progressively larger thus providing for a lessened expansion area ratio. However, since the majority of applications will provide for rocket travel through aerodynamic environments, which become progressively thinner in nature, the exit area ($Ae$) will also increase in a predetermined relative manner so as to provide for a closely controlled expansion area ratio. In other words, the ambient pressures which function to surround and control the relative radial expansion of the secondary gas stream 41, become less in rarer atmospheres.

The primary and secondary propellant means disclosed in FIG. 7, may also be constructed and arranged to provide precalculated varying relative linear and radial burning rates as hereinbefore discussed in conjunction with the FIG. 1 device. The progressive linear shortening of the outer case 21 is readily achieved in much the same manner as that of the outer casing of FIG. 1 since when a predetermined amount of heat is subjected to the explosive members 23, a precalculated shear type erosion occurs thereat.

It should be understood that the spirit of this invention is not limited to the rocket applications set forth herein for illustration purposes. For example, the novel features of this invention may be utilized to provide a cutting device wherein the structures of FIG. 1 and FIG. 4 are held in relatively stationary position and the main exhaust streams thereof were imparted to a work surface to be melted and thus, selectively formed. Also, the main exhaust streams can be seeded with appropriate materials, such as ceramic particles, to provide a plasma type device wherein the gaseous composition of ions could be utilized to thinly coat applicable structural surfaces.

Although this invention has been described and illustrated in detail, it is to be understood that the same is by way of illustration and example only and is not to be taken by way of limitation, the spirit and scope of this invention being limited only by the terms of the appended claims.

I claim:

1. A device having fore and aft end portions for continuously and progressively forming a gaseous passage comprising: a main burning means for continuously discharging a first gas stream when burned from an aft towards a fore end thereof at a first predetermined rate; secondary burning means constructed and arranged around said main burning means for burning from an aft towards a fore end thereof at a second predetermined rate for continuously discharging a second gas stream which forms a passage for controlling the expansion of said first gas stream, an aft end of said secondary burning means constructed and arranged to extend aftwardly of an aft end of said main burning means; and inhibitive means for preventing radial burning of said secondary burning means, said inhibitive means substantially constructed and arranged between said main and secondary burning means and having a portion thereof extending aftwardly from the aft end of said main burning means to the aft end of said secondary burning means.

2. A rocket construction comprising: a destructible casing means for progressively eroding from an aft to a fore end thereof, said casing means having an opening at the aft end thereof; sleeve means surrounded by said casing means and constructed and arranged forwardly of the aft end thereof, said sleeve means comprising a constituent capable of generating a secondary exhaust stream of predetermined configuration when progressively burned from an aft to a fore end thereof; main propellant means surrounded by said sleeve means with an aft end thereof forward of the aft end of said sleeve means for generating a main exhaust stream which is confined by said secondary exhaust stream when said main burning means is progressively burned from the aft end to a forward end thereof; and inhibitive means constructed and arranged on inwardly facing wall portions of said secondary burning means and extending forwardly from the aft end thereof a predetermined distance forward of the aft end of said main burning means.

3. The invention of claim 2 wherein said inhibitive means extends from the aft end of said sleeve means to the fore end thereof.

4. The invention of claim 2 wherein said main propellant means is constructed and arranged to provide an aftwardly extending cylindrical portion of predetermined wall thickness; and said inhibitive means is constructed and arranged to extend forwardly of the aft end of said main propellant means a distance substantially equal to the thickness of the wall of said cylindrical portion.

5. The invention of claim 2 wherein said casing means comprises: a plurality of hoop shaped members constructed and arranged in juxtaposed relation from the aft end to the fore end of said casing means; and weld means structurally connecting said juxtaposed members for melting and permitting the progressive separation thereof when said weld means are progressively subjeced to a predetermined temperature thereby providing for a progressive erosion of said casing means from an aft to a fore end thereof.

6. The invention of claim 2 wherein said destructible casing means comprises: a shell member of predetermined thickness; a plurality of channel members constructed and arranged to surround said shell member in predetermined array from an aft to a fore end thereof; and explosive means positioned within said channel members in abutting relation to said shell member for exploding and causing a shearing of said shell member thereat when said explosive means are progressively subjected to a predetermined temperature thereby providing for a progressive erosion of said casing means from an aft to a fore end thereof.

7. A device for progressively forming a continuous gaseous throat from an aft to a fore end thereof comprising: casing means providing an aperture at the aft end thereof and constructed and arranged to erode at a predetermined rate toward the fore end thereof when preselected portions of said casing means are progressively subjected to a predetermined temperature; secondary burning means positioned within said casing means for expelling a secondary gas stream when burned, the aft end of said secondary burning means constructed and arranged a predetermined distance forward of the aft end of said casing means for eroding thereat toward the fore end thereof at a predetermined rate relative to the eroding rate of said casing means; primary burning means positioned within said secondary burning means for expelling a primary gas stream when burned, the aft end of said primary burning means constructed and arranged a predetermined distance from the aft end of said secondary burning means for eroding thereat toward the fore end thereof at predetermined rate relative to the eroding rate of said secondary burning means; and inhibitive means formed on preselected inwardly facing wall portions of said secondary burning means and terminating at the aft end thereof, whereby upon simultaneous burning of said primary and secondary burning means at the aft ends thereof a continuous gaseous throat is progressively formed by said primary and secondary gas streams during all phases of burning thereof.

8. A device formed on a longitudinal axis for progressively forming a continuous gaseous passage comprising: cylindrically shaped casing means formed on said axis providing an aperture at an aft end thereof, said casing means constructed and arranged whereby incremental portions thereof erode at a predetermined rate toward a fore end thereof when said portions are progressively subjected to predetermined temperatures; cylindrically shaped primary burning means formed on said axis and positioned within said casing for expelling a primary gas stream when burned, said primary burning means constructed and arranged to provide a substantially conical shaped dished out portion on an aft end thereof with the apex thereof facing in a forward direction on said longitudinal axis; cylindrically shaped secondary burning means having a substantially uniform wall thickness along said longitudinal axis, surrounding said primary burning means and in abutting relation to said casing means for expelling a secondary gas stream when burned, an aft end of said secondary burning means constructed and arranged a predetermined distance between the aft end of said casing means and the aft end of said primary burning means; and an inhibitive means constructed and arranged to separate said primary and secondary burning means over juxtaposed facing surface portions thereof and extending aftwardly to the aft end of said secondary burning means, whereby upon simultaneous burning of said primary and secondary burning means a continuous passage of predetermined dimensions is progressively formed by said primary and secondary gas streams during all phases of burning thereof.

9. A device formed on a longitudinal axis for progressively forming a continuous gaseous passage comprising: casing means formed on said axis providing an aperture at an aft end thereof, said casing means constructed and arranged whereby incremental portions thereof erode at a predetermined rate toward a fore end thereof when said portions are progressively subjected to predetermined temperatures; primary burning means formed on said axis and positioned within said casing for expelling a primary gas stream when burned, said primary burning means constructed and arranged to provide an aftwardly and outwardly extending cylindrical portion of predetermined wall thickness; secondary burning means constructed and arranged between said casing means and the cylindrical portion of said primary burning means for expelling a secondary gas stream around said primary gas stream when burned, an aft end portion of said secondary burning means extending aftwardly of an aft end of said cylindrical portion; and an inhibitive means formed on an inwardly facing wall portion of said secondary burning means and extending forwardly from the aft end of said secondary burning means to the aft end of said primary burning means plus a distance substantially equal to the thickness of the wall of said cylindrical portion, whereby upon simultaneous burning of said primary and secondary burning means a continuous passage of predetermined dimensions is progressively formed by said primary and secondary gas streams during all phases of burning thereof.

10. A method for progressively forming a continuous nozzle passage at an aft end of a rocket device, said rocket device formed on a longitudinal axis and having an erosive type outer casing, a burning type main solid propellant means and a burning type secondary solid propellant means between said outer casing and said main propellant means comprising the steps of: progressively and continuously discharging a main propellant gas stream when said main propellant means burns from an aft end to a fore end thereof along said axis; progressively and continuously discharging a secondary propellant gas stream around said main propellant gas stream when said secondary solid propellant means burns from an aft end to a fore end thereof along said axis; maintaining the progressively moving burning aft ends of said main solid propellant means and said secondary solid propellant means a predetermined distance from each other; progressively and continuously eroding said erosive type outer casing from an aft end to a fore end thereof along said axis; maintaining the progressively changing burning aft ends of said secondary solid propellant means and said outer casing a predetermined distance from each other; and progressively forming a continuous gaseous passageway of predetermined configuration to guide and control the expansion of said first gas stream.

References Cited in the file of this patent

UNITED STATES PATENTS

| | | | |
|---|---|---|---|
| 1,191,357 | Snyder | | July 18, 1916 |
| 1,901,852 | Stolfa et al. | | Mar. 14, 1933 |
| 2,114,214 | Damblanc | | Apr. 12, 1938 |
| 2,424,934 | Kasper | | July 29, 1947 |
| 2,743,580 | Loeb | | May 1, 1956 |
| 2,753,801 | Cumming | | July 10, 1956 |
| 2,912,820 | Whitmore | | Nov. 17, 1959 |
| 2,937,595 | Margulis et al. | | May 24, 1960 |
| 2,957,306 | Attinello | | Oct. 25, 1960 |
| 2,974,481 | Smith | | Mar. 14, 1961 |
| 3,017,746 | Kiphart | | Jan. 23, 1962 |
| 3,020,709 | Bertin et al. | | Feb. 13, 1962 |
| 3,023,570 | Crouch | | Mar. 6, 1962 |
| 3,032,970 | Fox | | May 8, 1962 |
| 3,052,092 | Kirkbride | | Sept. 4, 1962 |

FOREIGN PATENTS

| | | | |
|---|---|---|---|
| 329,229 | Great Britain | | May 15, 1930 |
| 1,057,271 | France | | Oct. 28, 1953 |
| 1,197,701 | France | | June 8, 1959 |